(12) United States Patent
Wells et al.

(10) Patent No.: US 10,716,998 B2
(45) Date of Patent: Jul. 21, 2020

(54) GAMING CONTROLLER FOR MOBILE DEVICE AND METHOD OF OPERATING A GAMING CONTROLLER

(71) Applicant: RAZER (ASIA-PACIFIC) PTE. LTD., Singapore (SG)

(72) Inventors: Stuart Wells, San Francisco, CA (US); Anthony P. Casano, Felton, CA (US); Jeffrey Kinsey, San Mateo, CA (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 16/293,609

(22) Filed: Mar. 5, 2019

(65) Prior Publication Data
US 2019/0232159 A1  Aug. 1, 2019

Related U.S. Application Data

(63) Continuation of application No. 15/527,801, filed as application No. PCT/SG2014/000545 on Nov. 18, 2014, now Pat. No. 10,258,876.

(51) Int. Cl.
*A63F 13/235* (2014.01)
*A63F 13/24* (2014.01)
(Continued)

(52) U.S. Cl.
CPC ............ *A63F 13/235* (2014.09); *A63F 13/22* (2014.09); *A63F 13/23* (2014.09); *A63F 13/24* (2014.09);
(Continued)

(58) Field of Classification Search
None
See application file for complete search history.

(56) References Cited

U.S. PATENT DOCUMENTS 9,216,349 B2    12/2015  South
9,246,999 B2 *  1/2016   Milburn .................. H04N 5/04
(Continued)

FOREIGN PATENT DOCUMENTS

KR    20130070773 A    6/2013
TW      201019172 A    5/2010

OTHER PUBLICATIONS

Extended European Search Report dated May 7, 2018, 9 pages, for the corresponding European Patent Application No. 14906245.7.

*Primary Examiner* — Ronald Laneau
(74) *Attorney, Agent, or Firm* — Polsinelli PC

(57) ABSTRACT

In the present disclosure, a gaming controller for a mobile device is provided. The gaming controller can include a first hardware gaming controller including a first programmable controller and at least one input switch, the at least one input switch of the first hardware gaming controller configured to be manipulated by a user's left thumb and/or fingers to generate a left controller input with the first programmable controller. The gaming controller can include a second hardware gaming controller including a second programmable controller and at least one input switch, the at least one input switch of the second hardware gaming controller configured to be manipulated by a user's right thumb and/or fingers to generate a right controller input with the second programmable controller. The first hardware gaming controller and the second hardware gaming controller are each configured to be removably coupleable with a mobile device, the mobile device including a mobile device processor coupled to a memory module and configured to run a software application. Further, the first hardware gaming controller is configured to be mechanically secured to a side portion of a housing of the mobile device, and the second hardware gaming controller is configured to be mechanically secured to an opposing side portion of the housing of the
(Continued)

mobile device. The left controller input and the right controller input can be combined with a virtual controller module to form a virtual gaming controller with a single controller input representation for providing to the software application. A corresponding method for operating a gaming controller is also provided.

20 Claims, 9 Drawing Sheets

(51) Int. Cl.
*A63F 13/92* (2014.01)
*A63F 13/23* (2014.01)
*A63F 13/22* (2014.01)

(52) U.S. Cl.
CPC ........ *A63F 13/92* (2014.09); *A63F 2300/209* (2013.01)

(56) References Cited

U.S. PATENT DOCUMENTS

| | | |
|---|---|---|
| 9,764,231 B2 | 9/2017 | Townley et al. |
| 9,895,606 B1 | 2/2018 | Kamata et al. |
| 10,010,789 B2 | 7/2018 | Koizumi et al. |
| 2008/0064498 A1 | 3/2008 | Okamura |
| 2010/0216551 A1 | 8/2010 | Dwyer et al. |
| 2010/0248838 A1 | 9/2010 | Miyaji et al. |
| 2011/0312417 A1 | 12/2011 | MacKay |
| 2012/0034978 A1 | 2/2012 | Lim |
| 2012/0220372 A1* | 8/2012 | Cheung ............... G06F 3/04886 463/37 |
| 2013/0267322 A1 | 10/2013 | South |
| 2013/0296048 A1 | 11/2013 | Jeffrey et al. |
| 2014/0040765 A1 | 2/2014 | Fung et al. |
| 2014/0309038 A1 | 10/2014 | Patil |
| 2015/0018101 A1 | 1/2015 | Schoenith et al. |
| 2015/0281422 A1 | 10/2015 | Kessler et al. |
| 2016/0107082 A1 | 4/2016 | Song et al. |
| 2016/0361641 A1 | 12/2016 | Koizumi et al. |
| 2018/0178118 A1* | 6/2018 | Kyuma ................ A63F 13/28 |
| 2018/0178120 A1* | 6/2018 | Kyuma ................ A63F 13/24 |

* cited by examiner

GAMING CONTROLLER FOR MOBILE DEVICE AND METHOD OF OPERATING A GAMING CONTROLLER

CROSS-REFERENCE TO RELATED APPLICATIONS

This application is a continuation of U.S. patent application Ser. No. 15/527,801, filed May 18, 2017, which is a National Phase Application under 35 U.S.C. § 371 of PCT/SG2014/000545, filed on Nov. 18, 2014, which published as WO 2016/080906 on May 26, 2016, the contents of each are incorporated herein by reference to their entirety.

TECHNICAL FIELD

The present disclosure describes embodiments generally related to a gaming controller for a mobile device. Further, embodiments can relate to a method of operating a gaming controller.

BACKGROUND

Mobile devices are ubiquitous today's society and provide generally immediate access to communication, entertainment, and navigation as well as provide a seemingly endless array of solutions to problems that users sometimes do not even know exist. With the introduction of high-performance processors, graphics modules and high resolution displays into the hardware of mobile devices, mobile devices are now able to access and operate a plethora of resource hungry applications, for example, computer gaming applications.

Previously, mobile gaming was carried out with dedicated mobile gaming devices, which can typically include a device body with a display screen and controller buttons or joysticks provided on the device body. In comparison, complex computer games in various genres can now be operated on multi-functional mobile devices such as mobile phones and mobile tablet computers. However, there is a dissatisfaction in gaming on such multi-functional mobile devices, for which the primary function still remains as for communication, or for entertainment in watching a video or reading an article. This is due to the lack of hardware gaming controller features provided with the multi-functional mobile devices for physical user manipulation, which reduces the type and amount of user input into the gaming application as well as depreciates the gaming experience. Further, most personal computer (PC) based games which can now run on mobile devices require more input that what the touch-based display of mobile devices usually provide for.

In response to such a need, various manufacturers have provided hardware gaming controllers for connecting to a mobile device, typically a multi-functional mobile device. For example, a console gaming controller can be plugged into a mobile device through a universal serial bus (USB) connection, or can operate uncoupled from the mobile device through a wireless Bluetooth® connection. However, such separate gaming controllers take away from the mobility and portability of mobile devices, and handling the mobile device separate from the gaming controller is not desirable.

The proprietor of the present disclosure has previously released a gamepad controller peripheral, the Razer® Edge® Gaming Controller, which can receive a mobile tablet computer into a device body, and includes a pair of handles on both sides of the body, each handle including a joystick and controller buttons. The mobile computer is thus physically transformed to a dedicated gaming device, capable of being physically handled and providing hardware control elements for user manipulation.

However, a mobile device, in adapting such a gamepad controller peripheral for dedicated mobile gaming, becomes relatively heavy and bulky, which can be detrimental to a gamer operating such a device.

An alternative solution is thus sought in providing hardware gaming controllers for use with a mobile device with for gaming applications, to provide for a fuller gaming experience, and in which any impairment of the portability or handling of the mobile device is reduced.

SUMMARY

According to an embodiment, there is provided a gaming controller for a mobile device, including: a first hardware gaming controller including a first programmable controller and at least one input switch, the at least one input switch of the first hardware gaming controller configured to be manipulated by a user's left thumb and/or fingers to generate a left controller input with the first programmable controller; and a second hardware gaming controller including a second programmable controller and at least one input switch, the at least one input switch of the second hardware gaming controller configured to be manipulated by a user's right thumb and/or fingers to generate a right controller input with the second programmable controller; the first hardware gaming controller and the second hardware gaming controller each configured to be removably coupleable with a mobile device, the mobile device including a housing, and a mobile device processor coupled to a memory module and provided with the housing, the mobile device processor configured to run a software application; wherein the first hardware gaming controller is configured to be mechanically secured to a side portion of the housing of the mobile device, and the second hardware gaming controller is configured to be mechanically secured to an opposing side portion of the housing of the mobile device; and wherein the left controller input and the right controller input are combined with a virtual controller module to form a virtual gaming controller with a single controller input representation for providing to the software application.

According to an embodiment, there is provided a method of operating a gaming controller, the gaming controller including a first hardware gaming controller and a second hardware gaming controller each configured to be removably coupleable with a mobile device, the first hardware gaming controller configured to be mechanically secured to a side portion of a housing of the mobile device, and the second hardware gaming controller configured to be mechanically secured to an opposing side portion of the housing of the mobile device, the method including: generating a left controller input with a first programmable controller in the first hardware gaming controller, the first hardware gaming controller configured to be manipulated by a user's left thumb and/or fingers; generating a right controller input with a second programmable controller in the second hardware gaming controller, the second hardware gaming controller configured to be manipulated by a user's right thumb and/or fingers; combining the left controller input and the right controller input to form a virtual gaming controller with a single controller input representation; and providing the virtual gaming controller to a software application operating on a mobile device processor in the mobile device.

BRIEF DESCRIPTION OF THE DRAWINGS

In the drawings, like reference characters generally refer to the same parts throughout the different views. The drawings are not necessarily to scale, with emphasis instead generally being placed upon illustrating the principles of the present disclosure. It is to be noted that the accompanying drawings illustrate only examples of embodiments of this disclosure and are therefore not to be considered limiting of its scope, for the disclosure may admit to other equally effective embodiments. In the following description, various embodiments of the disclosure are described with reference to the following drawings, in which.

DETAILED DESCRIPTION

Figure 1A:
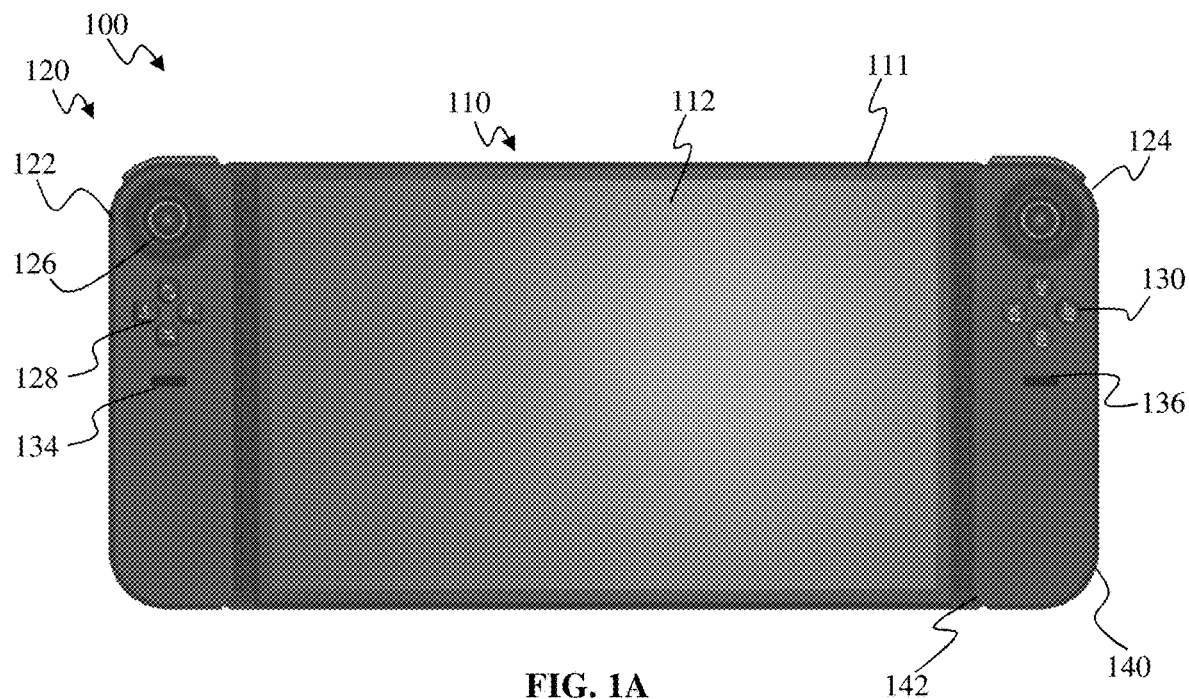
FIG. 1A illustrates a mobile gaming device according to an embodiment of the present disclosure.

Embodiments of a gaming controller for a mobile gaming device, a virtual gaming controller and a method of operating a gaming controller are described in detail below with reference to the accompanying figures. However, it should be understood that the disclosure is not limited to specific described embodiments. It will be appreciated that the embodiments described below can be modified in various aspects, features, and elements, without changing the essence of the disclosure. Further, any reference to various embodiments shall not be construed as a generalization of any inventive subject matter disclosed herein and shall not be considered to be an element or limitation of the appended claims except where explicitly recited in a claim(s).

According to various embodiments, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" herein means "and/or" unless specifically indicated otherwise.

The present disclosure can describe embodiments of a consumer electronic device which can be operable in various orientations, and it thus should be understood that any of the terms "top", "bottom", "base", "down", "sideways", "downwards" etc., when used in the following description are used for convenience and to aid understanding of relative positions or directions, and not intended to limit the orientation of the recording medium or a system or apparatus or product incorporating the recording medium.

A computing system or a controller or a microcontroller or any other system providing a processing capability can be presented according to various embodiments in the present disclosure. Such a system can be taken to include a processor. A device or system according to the present disclosure can include a memory which is for example used in the processing carried out by the device or system. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with various alternative embodiments. Similarly, a "module" is thusly defined as a portion of a system according to the present disclosure and may encompass a "circuit" as above, or may be understood to be any kind of a logic-implementing entity therefrom.

In the specification, the term "comprising" shall be understood to have a broad meaning similar to the term "including" and will be understood to imply the inclusion of a stated feature or step or group of features or steps but not the exclusion of any other feature or step or group of features or steps. This definition also applies to variations on the term "comprising" such as "comprise" and "comprises".

The reference to any prior art in this specification is not, and should not be taken as an acknowledgement or any form of suggestion that any referenced prior art forms part of the common general knowledge.

FIG. 1A illustrates a mobile gaming device according to an embodiment of the present disclosure. Mobile gaming device 100 is shown, and for clarification, can be understood to be a mobile device for gaming and capable of operating as a mobile gaming device. Mobile gaming device 100 can include a mobile device 110. The mobile device 110 or mobile computer or mobile computing device can be a mobile tablet computer, including a housing 111, the housing 111 including or housing a display screen 112 and a hardware processing system (not shown) including various circuitry and semiconductor based components and electronics, for operating a mobile computing device. The mobile device 110 can be operated independently from the mobile gaming device 100 or can be integrated as one with the mobile gaming device 100. The display screen 112 can be a touch-enabled screen, allowing for user interaction through the screen. The mobile gaming device 100 further includes a pair of controllers 120 coupled to the mobile device 100.

As mentioned above, a solution is desired, in which a mobile device is provided with hardware controllers for gaming applications, which any impairment of the portability or handling of the mobile device is reduced. In coming up with such a gaming controller peripheral solution, the present inventors came across a need to break a single game controller into a plurality of devices. For example, hardware components for the left side of the controller had to be separated from the hardware components for the right side of the controller.

Typically, game controllers connect to a computer or game console though a cable using a USB protocol, or wirelessly with the Bluetooth® protocol. The available buttons and axis controllers are defined using the USB human control interface device class transport protocol (HID). The HID transport protocol has been adapted to other protocols, such as Bluetooth, to describe when a button has been pressed or a joystick has been moved. The HID protocol defines the capabilities of the game controller attaching to the computer through an HID descriptor, while changes in state of buttons and joysticks are represented through HID reports. The operating system of a computer or mobile device, such as Linux®, Android™ and Windows, process HID descriptors and reports to create a one-to-one mapping of devices and interfaces, so a game application sees the input of every attached device in making use of them.

However, most game applications assume that there is a single HID interface for a game controller, and are written as such. As such, to break a game controller into a plurality of devices leads to where game applications have to be re-written for proper operation, for example to receive a HID input from a left-side controller and a HID input from a right-side controller. This would be counter-intuitive, and limit any benefit in providing a game controller peripheral in which any impairment of the portability or handling of the mobile device is reduced.

Various embodiments of the present disclosure seek to provide a virtual gaming controller with a single controller input representation formed from combining separate inputs from the plurality of devices broken down from a typical game controller. Such a virtual gaming controller is thereafter provided to the software gaming application in representation of a user's input through the plurality of devices broken down from a typical game controller.

According to various embodiments of the present disclosure, a pair of controllers 120, including a first left-side controller 122 and a second right-side controller 124, are provided, for removably coupling to a mobile device 110. The first controller 122 and the second controller 124 can be provided on opposing sides of the display screen 112 of the mobile device 110. The first controller 122 and the second controller 124 can be removably coupled to the mobile device 110. Such a coupling includes a physical mechanical coupling, as well a data communication coupling between the gaming controllers 120 and the mobile device 100. The mechanical coupling between the controller and the mobile device 110 is configured to secure the controller adjacent to the mobile device 110, such that controller maintains a firm connection with the mobile device 110 during use.

A snap-on interface can be provided between a controller 120 and the mobile device 110, where the controller 120 is securely but removably fastened onto the mobile device 110. In embodiments, the physical coupling of the controllers 120 to the mobile device 110 can be with a magnetic coupling. In embodiments, the housing of controller 120 and mobile device 110 can be correspondingly molded to provide for a better fit, as well as to provide a good secure grip in handling for a user. In embodiments, the physical coupling includes a USB port connection. The controllers 120 can each include a male USB plug which is arranged to mate with a female USB port or socket on the mobile device 110. The USB connection can be carried out with any connection or at any speed in association with a USB connection. Such a serial USB connection can also provide for a data communication connection between the controllers 120 and the mobile device 110. In embodiments, the controller 120 and mobile device 110 include a data communication coupling which can be a wireless data communication coupling. The wireless data communication coupling can be any one of a Bluetooth® connection, a Wireless Universal Serial Bus (WUSB) connection, a radio frequency connection, or an infrared data connection.

It is noted that the first controller 122 and the second controller 124 are provided as separate entities, and are coupled to either side of the mobile device 110. In such a way, the first controller 122 and the second controller 124 include separate electronics or components with each controller for the independent operation of each controller as a gaming controller, even though the first controller 122 and the second controller 124 are provided for a single-side input from a user for a gaming application. In an embodiment, the first controller 122 includes a first programmable controller, and the second controller 124 includes a second programmable controller. This is in comparison to typical gaming controllers, provided in a single device, where left-side input is coupled to right-side input, and processed with a single set of electronics or components. In various embodiments, the first controller and the second controller are provided as a singular gaming controller peripheral, physically connected by perhaps a receiving plate, the gaming controller peripheral arranged to receive a mobile device. Such an arrangement can be provided for additional support in receiving the mobile device, or in providing an additional battery back for extended operation of the mobile gaming device. However, the first controller and the second controller can still remain as separate operating entities, each configured to send controller input independently to the mobile computing device.

In an embodiment, the first controller and the second controller are permanently coupled onto the mobile device in forming the mobile gaming device. In such an embodiment, the first controller and the second controller can still each include electronics and components and are arranged to function independently of each other. In an embodiment, the first controller and the second controller are provided for operation independent physically from the mobile device. A user can activate the first controller and second controller, which can be the left half and the right half of a gaming controller, and wireless communication can be utilized for operation as according to embodiments of the present disclosure.

Controllers 120 can each include one or more input switches for user manipulation, for example, a joystick controller 126, and a set of gaming control buttons 128. Any number of gaming control buttons can be provided in the set, which can differ in number and configuration between the set on the left controller 122 and the set on the right controller 124. For example, the left controller 122 can include a set of gaming control buttons 128 which can include four buttons set out in a directional pad configuration, while the right controller 124 can include a set of gaming control buttons 130 which can include a plurality of action control buttons. Further, additional shoulder buttons 132 can be provided at an edge of the controllers 120 corresponding to a top side of the mobile device 110. The shoulder buttons 132 are arranged to be operated by an index finger, and can include multiple shoulder buttons on each controller 120. Input switches on the left controller 122 can be configured to be manipulated by a user's left thumb and/or fingers to generate a left controller input, while input switches on the right controller 124 can be configured to be manipulated by a user's right thumb and/or fingers to generate a right controller input.

Controllers 120 can include an indicator 134 provided on a front surface of the controller 120. The indicator 134 can include a light-emitting diode (LED) which can provide an indication to a user. For example, the LED indicator can indicate status of the controller, i.e. activation or operation of the controllers, or can indicate that a wireless coupling is established between the controller 120 and the mobile device, or can be for a battery indication function. In embodiments, the indicator 134 can include a number of differently-colored LEDs, which can thereafter provide various kinds of notifications, through lighting up, or intervallic blinking of the LEDs.

Controllers 120 can further include an elongate horizontal button 136 provided under the gaming control buttons 128. The horizontal button 136 can be provided for various gaming functions, for example, for a pause function, or a select function, or any other appropriate function. Other buttons or functions can be provided on one or both controllers in various other embodiments.

Figure 1B:
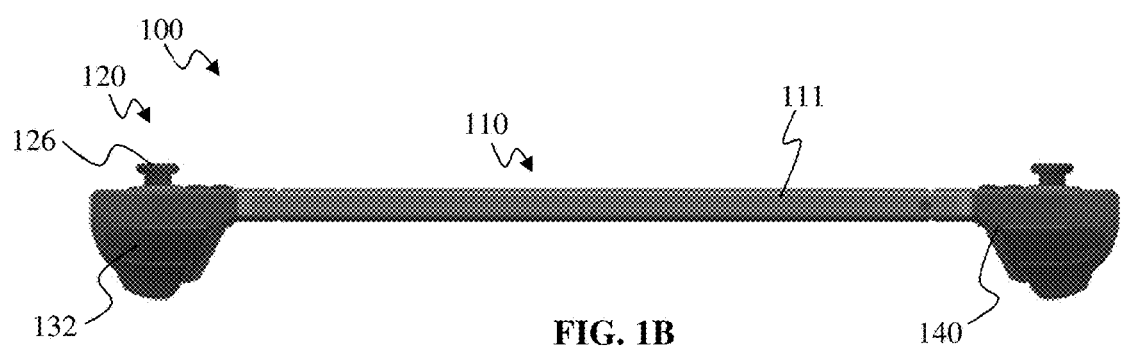
FIG. 1B illustrates a side profile of the mobile gaming device of FIG. 1A.

FIG. 1B illustrates a side profile of the mobile gaming device 100 of FIG. 1A. FIG. 1B can be a top-down view from the direction indicated by A in FIG. 1A. Each of the controller 120 can be provided with a joystick 126 and shoulder buttons 132 for manipulation by a user. Further, FIG. 1B highlights the slim form factor of the mobile gaming device 100, which does not introduce noticeable girth to the thickness of the mobile device 110, in providing a hardware gaming controller 120 for gaming applications.

Controllers 120 can each be provided with a body 140 with a dimension of one of its sides 142 substantially similar to the breadth of the mobile device 110, and arranged to be coupled to one of both sides of the mobile device. The body 140 can thus provide a physical extension of the mobile device 120, which can be used for handling and manipulated by the user. Further, the body 140 can be ergonomically designed and formed, and arranged to provide a comfortable grip by a user's hand in engaging with the mobile gaming device 100. It can be observed that the left controller 122 is provided separately from the right controller 124 and each includes an individual coupling to or with the mobile device 110.

Figure 2A:
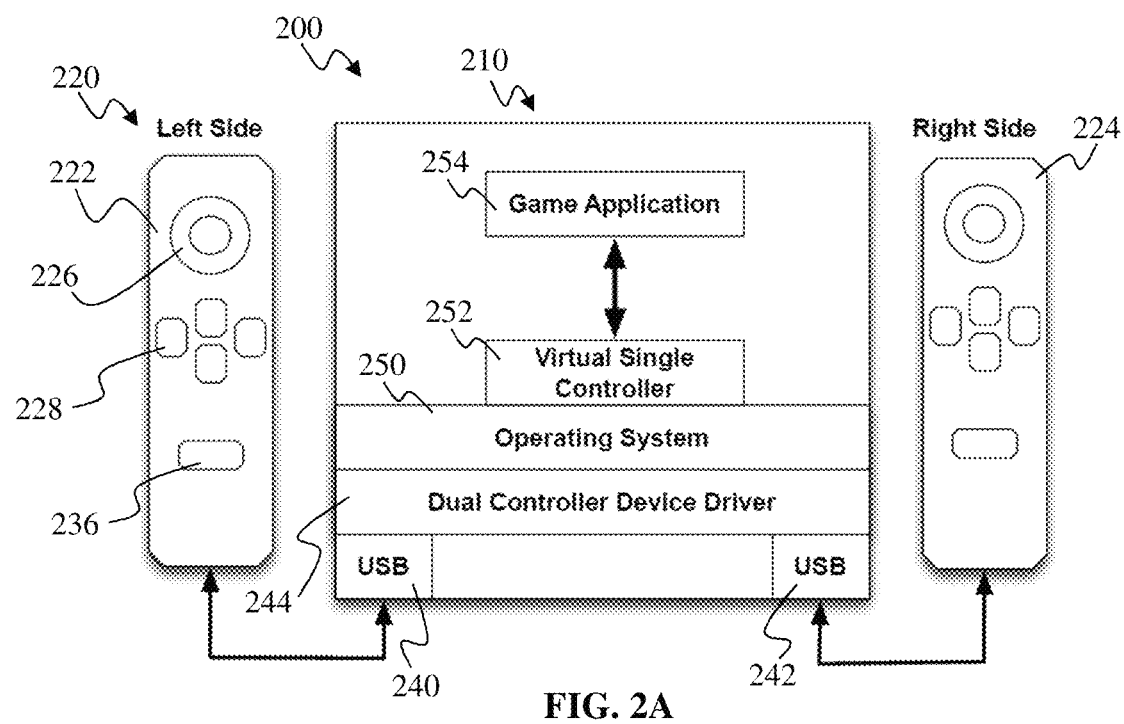
FIG. 2A illustrates a schematic representation of a mobile gaming device according to an embodiment.

FIG. 2A illustrates a schematic representation of a mobile gaming device 200 according to an embodiment. Controllers 220 are provided for a mobile device 210. First left-side hardware controller 222 and second right-side hardware controller 224 are provided and arranged for coupling with the mobile device 210. The gaming controllers 220 can include a variety of hardware controller buttons, for example, joystick 226, gaming control buttons 228 and horizontal button 236. Other buttons or functionality can be included, where needed.

Mobile device 210 can include a mobile processor (not shown) and a memory module (not shown) which allow the function of the mobile device 210 as a computing device. Various other electronics, components, circuits and modules can run on the mobile device 210, with or without coupling to the mobile processor or the memory module. Mobile device 210 can include a USB port. In embodiments, two USB ports are provided, a left USB port 240 for coupling with the left controller 222 and a right USB port 242 for coupling with the right controller 224. The USB ports 240, 242 can be a USB socket arranged to receive a USB plug on the controllers 220 to form a USB coupling. The USB coupling can be a micro-USB coupling operating under the USB 3.0 protocol, but other USB couplings or other comparable couplings can be utilized.

Left controller 222 and right controller 224 can include sufficient hardware and programmable components to each function as a standalone controller. Left controller 222 and right controller 224 can receive user manipulation or control and in response generate control data which can be according to HID protocol. Left controller 222 and right controller 224 can generate a HID input, such as a plurality of HID descriptors and reports in accordance to user input or manipulation of the joystick 226 or gaming control buttons 228 of the controllers 220, and subsequently provide the HID input to the mobile device 210 for processing and entry for use in for example, a software gaming application. The USB couplings formed by connection between the mobile device 210 and the left controller 222 and the right controller 224 and the left USB port 240 and the right USB port 242 can thus be a HID coupling. In various embodiments, a plurality of HID interfaces are provided for a plurality of game controllers coupled to the mobile device in a mobile gaming device.

Mobile device 210 can further include a device driver 244. In embodiments, the device driver 244 can be a controller device driver, arranged to receive HID input from a hardware controller operating under the HID protocol and interpreting the HID input for further processing. In embodiments, the device driver 244 can be a dual controller device driver, arranged to receive HID input from two hardware controllers and interpreting the HID input from the two hardware controllers for further processing. Device driver 244 can be coupled to left USB port 240 and right USB port 242, and receive information from left controller 222 and right controller 224 through the left USB port 240 and right USB port 242 respectively. Device driver 244 can identify when HID input is generated and made available by the controllers 220, and thereafter receives, translates and delivers the translated information to the operating system for consumption. Device driver 244 can be a computer program operating in a kernel on the mobile processor and memory module of the mobile device 210, and can communicate with the coupled controllers 220 through an established HID interface. Device driver 244 can be dependent on the hardware of the controllers 220 and the mobile device 210, as well as dependent on the kind operating system run by the mobile device 210, and acts as a type of translator between the controllers 220 and the mobile device 210.

Device driver 244 communicates with an operating system program 250 running on the mobile device 210, supported by the mobile device processor and memory module. The operating system 250 generally manages the hardware and software components of the mobile device, and provides and functions as an interface between the device and a user. The operating system 250 can operate various kinds of software applications for the mobile device, for example word processing, internet browsing, music, movies, gaming, etc., which can run on the operating system 250 as dedicated standalone applications. In embodiments, the operating system 250 of the mobile device 210 is an Android operating system for mobile devices, but other operating systems such as Linux or Windows or iOS can be suitable as well.

Mobile device 210 further includes a virtual controller module 252. Virtual controller module 252 can operate on the processor of the mobile device, for example in the operating system 250, and is arranged to receive a HID input from the gaming controllers 220. Such HID input can be translated by the device driver 244 prior to being received by the operating system 250 and the virtual controller module 252. The virtual controller module 252 is configured to receive HID input, such as a left controller input from the left controller 222 and a right controller input from the right controller 224. The virtual controller module 252 is further configured to combine both the left controller input and the right controller input to form a single controller input representation that contains all the elements of a combined controller. As such, even though the left controller 222 and the right controller 224 are provided as separate entities with separate hardware and programmable parts, the input from both the left controller 222 and the right controller 224 are both amalgamated in the coupled mobile device for operation as though the left controller and the right controller form part of the same controller, through the virtual controller module 252. Such a single controller representation is then passed on to a game application 254 running on the mobile device 210.

Figure 2B:
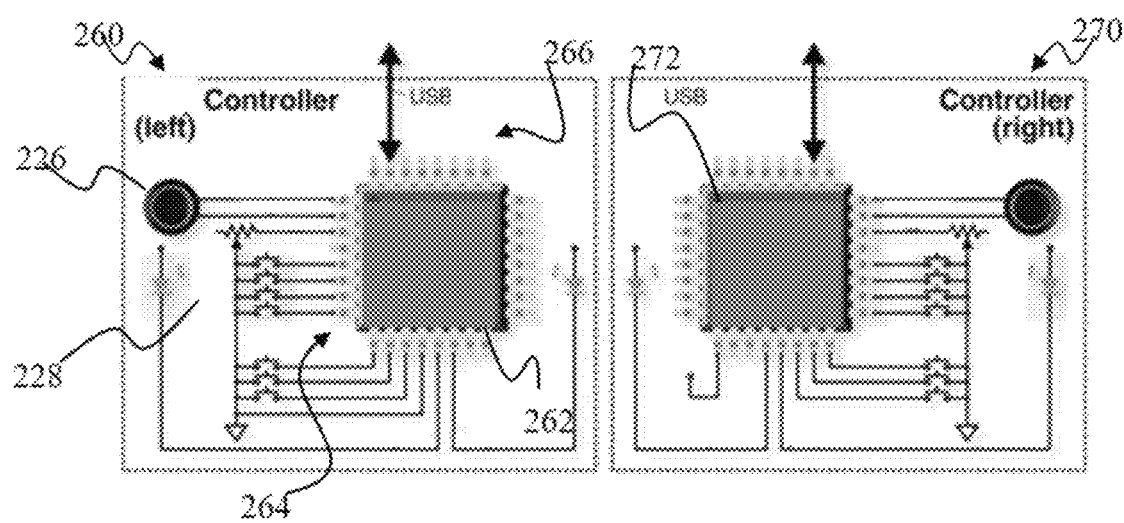
FIG. 2B illustrates a circuit schematic of the hardware gaming controllers of FIG. 2A.

FIG. 2B illustrates a circuit schematic of the hardware gaming controllers of FIG. 2A. Circuit 260 provides a representation of the hardware component connections in relation to left gaming controller 222. A programmable controller 262 can be provided in the left gaming controller 222, arranged to carry out functionality relating to operating a gaming controller. The programmable controller 262 can be an integrated circuit, or a microcontroller, or a microprocessor, provided as a semiconductor device for operation. The controller 262 can include a small processor for carrying out various functionalities. The controller 262 can be arranged to receive a plurality of inputs and generate a plurality of outputs. A plurality of general purpose input/output (GPIO) pins 264 can be provided, to provide communication with various components. For example, a set of pins are configured to communicate with joystick 226 and gaming control buttons 228, to receive input from these controls. Further, output pins can be coupled to one or more LED indicators for controlling the LEDs. In addition, the gaming controller can also include a vibration module, to provide vibration feedback for a user.

In addition, a set of pins 266 are arranged to be dedicated for USB communication, and can be coupled to a USB plug provided on the left gaming controller 222, for carrying out a USB coupling with the mobile device 210. Pins 266 can carry an amount of information for providing to the device driver. In embodiments, controller 262 can include an analog-to-digital converter function in addition to a programming execution function. In such a way, input received from gaming controls such as the joystick 226 and gaming control buttons 228 can be received as analog input by the controller 262, and thereafter converted to digital data, which can then be rearranged for output as HID information, for example containing HID descriptors and reports. The circuit 260 and controller 262 can further be arranged for additional functionality if the need so requires.

Circuit 270 provides a representation of the hardware component connections in relation to right gaming controller 224. A programmable controller 272 can be provided in the right gaming controller 224, arranged to carry out functionality relating to operating a gaming controller. In an embodiment, the left gaming controller 222 is equivalent to the right gaming controller 224, except operating for receiving input from different sides for a user. As such, the circuit 260 for the left gaming controller 222 is equivalent to the circuit 270 for the right gaming controller 224.

Figure 3:
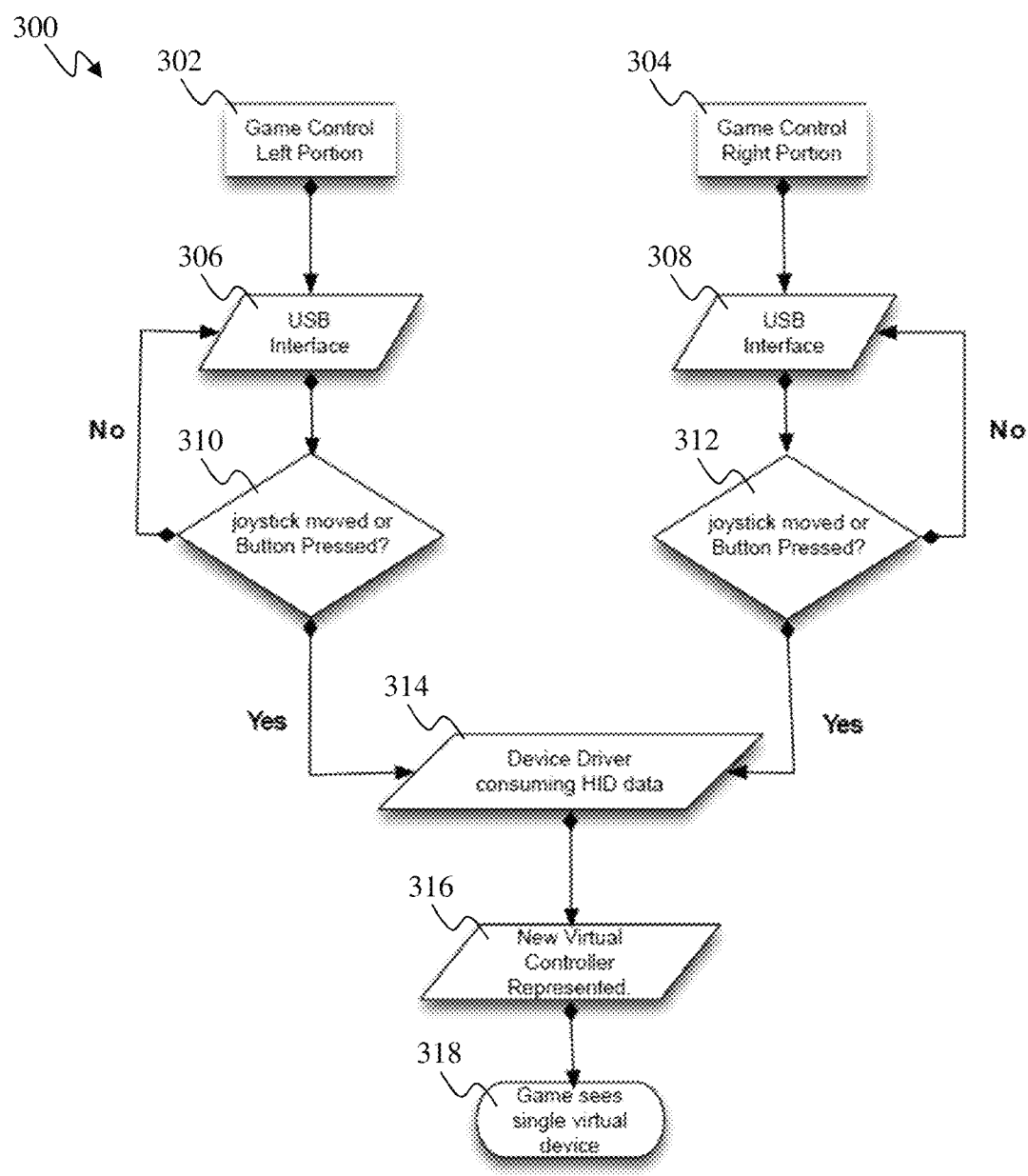
FIG. 3 illustrates a flow chart setting out the operation of gaming controllers in a mobile gaming device according to an embodiment.

FIG. 3 illustrates a flow chart setting out the operation of gaming controllers in a mobile gaming device according to an embodiment. The flow chart 300 of FIG. 3 can correspond to the operation of gaming controllers in a mobile gaming device, as shown and described in FIGS. 2A and 2B. In flow chart 300, left gaming controller 222 is schematically represented by game control left portion block 302, while right gaming controller 224 is schematically represented by game control left portion block 304. A USB interface 306 can be provided for left controller 222 and USB interface 308 can be provided for right controller 224. A monitoring block 310 can be provided for determining if a joystick 226 is moved or a gaming control button 228 is depressed on the left controller 222 and if so, HID information is sent from the left controller 422 to the mobile device 210 over USB interface 306. If no movement or control input is detected, a loop back is made to continue monitoring USB interface 306 for any left controller input from the left controller 222. If movement or control input is detected, the process flow carries on. HID input is delivered from the left controller 222 to the USB port 240 of the mobile device 210 and to the device driver 244. Correspondingly, a monitoring block 312 is provided for the right controller 224, operating in a similar manner.

At 314, device driver 244 receives and consumes HID data from either the left controller 222 or the right controller 224 for processing. In embodiments, the device driver 244 receives from both the left controller 222 and the right controller 224 for processing. In embodiments, the device driver 244 receives controller information from either or both of the left controller 222 or the right controller 224 within a predetermined sampling period and proceeds to process the received controller information. According to various embodiments, left controller input and right controller input are received as separate data packets by the mobile device 210. In embodiments, the left controller input and the right controller input can include an identifier in the corresponding data packet, to identify the data packets as being from a left controller or a right controller.

At 316, a virtual controller is formed, based on the input received from the device driver at 318. The virtual controller can be formed with the virtual controller module 252, which can combine the received data packets obtained from the left controller 222 and/or the right controller 224 to form a virtual gaming controller with a single controller input representation. In an embodiment, a predetermined sampling period is provided, and any left controller input or right controller input received by the device driver 244 during the sampling period is provided to the virtual controller module for forming a virtual gaming controller with single or combined controller input representation. At 318, the virtual gaming controller including combined controller input is provided to the software application for handling. It is thus noted that the software gaming application only sees a single virtual device, instead of the physically connected separate gaming controllers delivering separate HID data.

Figure 4:
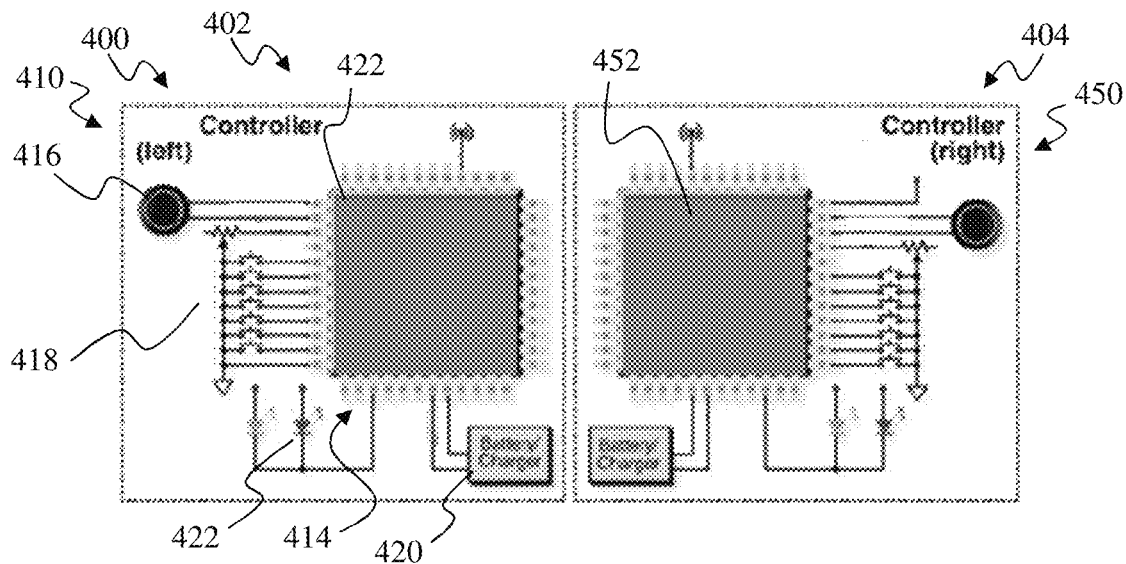
FIG. 4 illustrates a circuit schematic of hardware gaming controllers according to an embodiment.

FIG. 4 illustrates a circuit schematic of hardware gaming controllers according to an embodiment. Circuit representation 400 illustrates a possible circuit layout in representation of hardware component connections for a left gaming controller 402 and a right gaming controller 404 according to an embodiment. The gaming controllers are configured to be physically coupled to a mobile device to provide a mobile gaming device, in a manner similar to that of mobile gaming device 100. According to an embodiment, the gaming controllers 402, 404 can be configured for wireless data communication coupling to the mobile device. HID information generated by the gaming controllers 402, 404 are thus provided to the mobile device through wireless data communication.

Such a wireless data communication coupling can be a Bluetooth connection, but other wireless data couplings can be provided as appropriate. In such a case, a Bluetooth transceiver is provided in both the left gaming controller and the right gaming controller. Further, the mobile device can include multiple Bluetooth transceivers, one for communication with the left gaming controller and another for communication with the right gaming controller, or a single transceiver that is capable of hosting multiple Bluetooth channels for communication, and thus capable of communicating with multiple peripheral devices concurrently. The mobile device can host not only the dual gaming controllers wirelessly, but also maintain wireless communication with other computing peripherals, for example, speakers, keyboards, computer mice, etc.

Circuit 410 provides a representation of the hardware component connections in relation to the left gaming controller 402. A programmable controller 412 can be provided in the left gaming controller 402, arranged to carry out functionality relating to operating a gaming controller. The controller 412 can include a microcontroller processor for carrying out various functionalities and can be arranged to receive a plurality of inputs and generate a plurality of outputs. A plurality of GPIO pins 414 can be provided for communication with various components on the left gaming controller 402. The left gaming controller 402 can have components in communication with the controller 412, such as a joystick controller 416 and various gaming control buttons 418.

Controller 412 can include a radio frequency (RF) transmitter incorporated into the integrated circuit of the controller 412, the RF transmitter capable of establishing a Bluetooth connection with a compatible receiver for wireless data communication. The transmitter can also be a Bluetooth transceiver, arranged to send and receive information to and from the mobile device. Such a transceiver is useful to receive feedback from the mobile device, for communication back to the user. Gaming control data can be sent to the mobile device for use in a gaming application, and in return the gaming application can provide information back to the controller for user consumption, for example, instructions to carry out a vibration of the gaming controller in response to a user's actions in a gaming application.

The Bluetooth transmitter can be a Bluetooth Low Energy Technology-based transmitter, which allows for a wireless data communication with low power consumption, allowing for longer usage in operation. In embodiments, the left gaming controller 402 can include a separate Bluetooth transmitter or transceiver, arranged to wireless couple to a corresponding receiver on the mobile device, and send data information over the wireless coupling. The Bluetooth transmitter can be coupled to the controller 412 through one or more of the GPIO pins 414.

In enabling operation of the controller 412 as well as wireless data communication, a power source is required. Left gaming controller 402 can include a battery pack 420 for delivery of electrical power to the controller 412. In embodiments, the left gaming controller 402 can be decoupled from the mobile device, and the left gaming controller 402 be plugged into an electrical source for charging the battery pack 420. In embodiments, the left gaming controller 402 can include an electrical coupling to the mobile device, where the battery source of the mobile device can be coupled to the battery pack 420 of the left gaming controller 402, for shared charge dissipation, or for priority charge dissipation, where a certain battery source is depleted first before another. In an embodiment, in coupling battery sources, the battery source of the mobile device is configured to be drained first, while not utilizing charge on the left gaming controller 402. The mobile device can then be plugged into an electrical source for charging and maintaining the charge level of its battery source.

Further, the battery pack 420 can include a sensor in the battery pack which can be coupled to the controller 412 to provide information on the status of the battery pack 420, for example, amount of charge remaining in the battery pack 420. Controller 412 can further be connected to a battery indication LED 422 in the left gaming controller, to provide an indication of the battery status. The left gaming controller 402 can further include a status LED for indication of the activation of the controller.

Circuit 450 provides a representation of the hardware component connections in relation to right gaming controller 404. A programmable controller 452 can be provided in the right gaming controller 404, arranged to carry out functionality relating to operating a gaming controller. Similarly, the controller 452 can include a capability to carry out a Bluetooth function or communication. According to an embodiment, the left gaming controller 402 is equivalent to the right gaming controller 404, except operating for receiving input from different sides for a user. As such, the circuit 410 for the left gaming controller 402 is equivalent to the circuit 450 for the right gaming controller 404.

Figure 5:
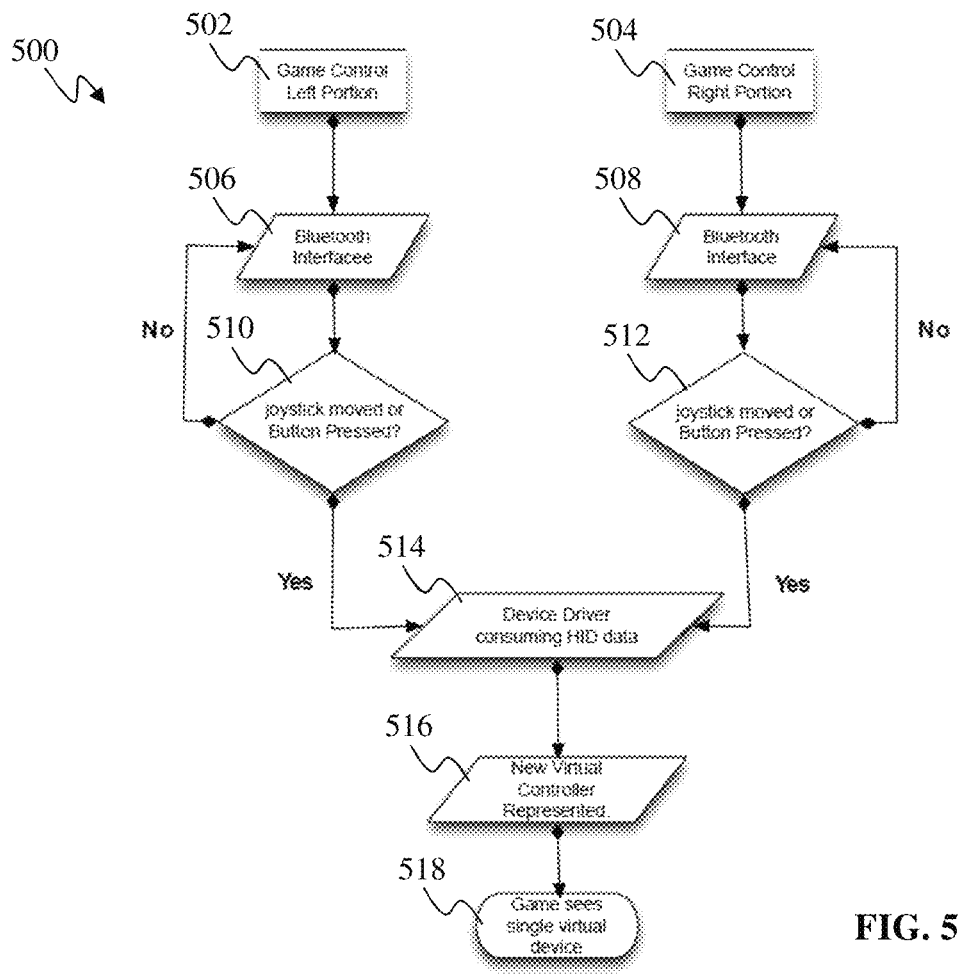
FIG. 5 illustrates a flow chart setting out the operation of gaming controllers in a mobile gaming device according to an embodiment.

FIG. 5 illustrates a flow chart setting out the operation of gaming controllers in a mobile gaming device according to an embodiment. The flow chart 500 of FIG. 5 can correspond to the operation of gaming controllers in a mobile gaming device, as shown and described in FIG. 4. In flow chart 500, the left gaming controller 402 is schematically represented by game control left portion block 502, while the right gaming controller 404 is schematically represented by game control left portion block 504. A Bluetooth interface 506 can be provided for the left controller 402 and Bluetooth interface 508 can be provided for the right controller 404. A monitoring block 510 can be provided for determining if a joystick 416 is moved or a gaming control button 418 is depressed on the left controller 402 and if so, HID information is sent from the left controller 402 to the mobile device over Bluetooth interface 506. If no movement or control input is detected, a loop back is made to continue monitoring Bluetooth interface 506 for any left controller input from the left controller 402. If movement or control input is detected, the process flow carries on. HID input is delivered from the left controller 402 through a Bluetooth connection made between the controller 412 and a corresponding receiver on the mobile device. The HID input is subsequently provided to device driver in the mobile device.

Correspondingly, a monitoring block 512 is provided for the right controller 404, operating in a similar manner.

At 514, the device driver receives and consumes HID data from either the left controller 402 or the right controller 404 for processing. The device driver can receive HID input from the left controller 402 only, from the right controller 404 only, or from the left controller 402 and the right controller 404, either concurrently, or within a predetermined time period or sampling period. The device driver upon receiving HID controller input proceeds to process the received controller information. According to various embodiments, left controller input and right controller input are received as separate data packets by the mobile device. In embodiments, the left controller input and the right controller input can include an identifier in the corresponding data packet, to identify the data packets as being from a left controller or a right controller.

At 516, a virtual controller is formed, based on the input received from the device driver at 518. The mobile device can include a virtual controller module which can be arranged to combine the received data packets obtained from the left controller 402 and/or the right controller 404 to form a virtual gaming controller with a single controller input representation. At 518, the virtual gaming controller including combined controller input is provided to the software application for handling. It is thus noted that the software gaming application only sees a single virtual device, instead of the physically connected separate gaming controllers delivering separate HID data.

Figure 6A:
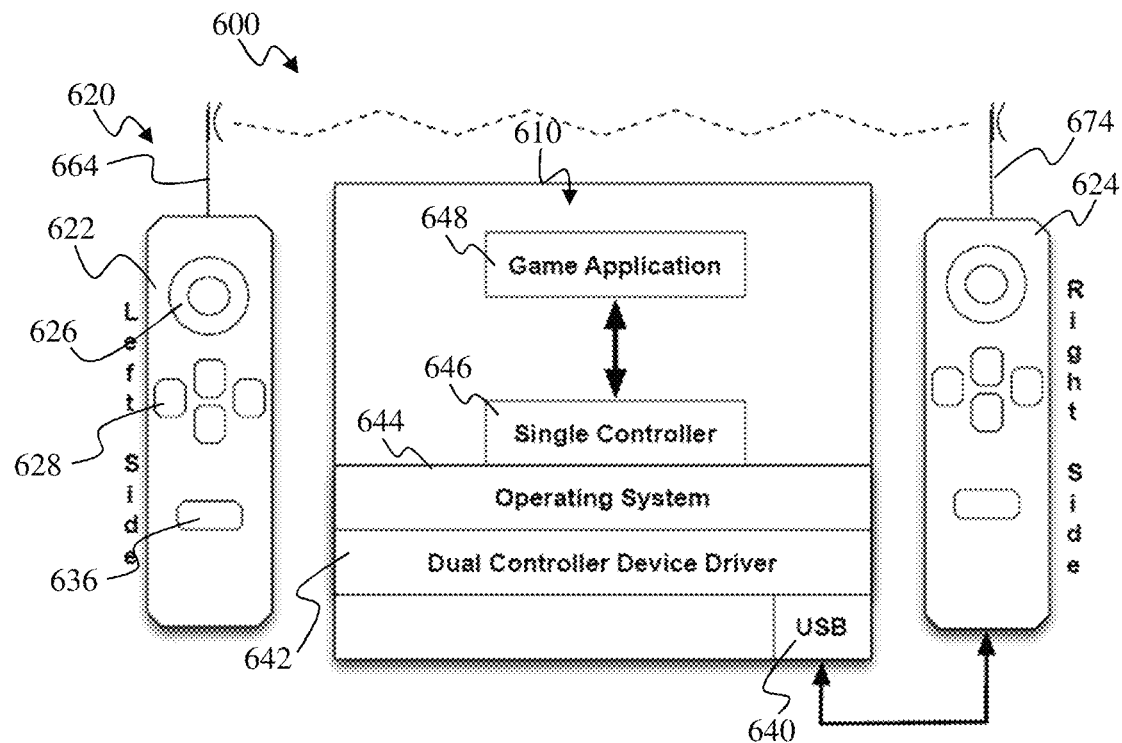
FIG. 6A illustrates a schematic representation of a mobile gaming device according to an embodiment.

FIG. 6A illustrates a schematic representation of a mobile gaming device 600 according to an embodiment. Controllers 620 are provided for a mobile device 610. First left-side hardware controller 622 and second right-side hardware controller 624 are provided and arranged for coupling with the mobile device 610. The gaming controllers 620 can include a variety of hardware controller buttons, for example, joystick 626, gaming control buttons 628, etc. Other buttons or functionality can be included, where needed.

According to an embodiment, one of the pair of controllers 620 can be arranged to send its state or any controller input wirelessly, for example through a radio frequency, to update its status. In an embodiment, the left controller 622 is arranged to wirelessly send controller input to the right controller 622. Right controller is thereafter arranged to send both the left controller input and the right controller input, in separate data packets, to the mobile device 610. Left controller 622 can include a Bluetooth transmitter 664 to carry out such a wireless transmission to right controller 624. Correspondingly, right controller 624 can include a Bluetooth receiver 674 to receive such wireless transmission from left controller 622. Further, right controller 624 can include a USB plug for coupling to a USB port 640 on the mobile device 610.

HID input is generated from the left controller 622 in response to user input or manipulation of the joystick or gaming control buttons of the left controller 622. Such HID information for the left controller, or left controller input, can then be wirelessly delivered to the right controller 624. Right controller 624 can also generate HID input, or a right controller input, in response to user input or manipulation of the joystick or gaming control buttons of the left controller 624. The left controller input and the right controller input are handled as separate or distinct data packets in the right controller 624, and both the left controller input and the right controller input are subsequently provided to the mobile device 610 through the USB coupling through USB port 640.

Mobile device 610 can further include a device driver 642, the device driver 642 arranged to receive HID input from the controllers 620 for further processing in interpretation of the HID input for computing consumption on the operating system 644. Device driver 642 communicates with an operating system program 644 running on the mobile device 610, supported by mobile device processor and a memory module. Mobile device 610 further includes a virtual controller module 646. Virtual controller module 646 can operate on the processor of the mobile device, for example in the operating system 644, and is arranged to receive HID input from the gaming controllers 620. The virtual controller module 644 is further configured to combine both the left controller input and the right controller input to form a single controller input representation that contains all the elements of a combined controller. Such a single controller representation is then passed on to a game application 648 running on the mobile device 610.

In embodiments, left controller 622 is arranged to wirelessly send controller input to the right controller 622, and right controller is thereafter arranged to also wirelessly send both the left controller input and the right controller input, in distinct data packets and with appropriate identifiers, to the mobile device 610. In such a case, Bluetooth transceivers are provided in both controllers 620, as well as in the mobile device 610.

According to various embodiments, one of the gaming controllers can combine separate controller information, prior to providing a single controller representation to the mobile device. Accordingly, the gaming controllers can include a primary game controller and a secondary game controller. In an embodiment, the right controller can be the primary game controller and the left controller is the secondary game controller. A wireless connection is provided between the controllers, and left controller input is sent to the right controller input upon manipulation by a user and generation thereafter. Right gaming controller can also generate a right controller input similarly Right gaming controller can include a programmable controller which can be configured to receive left controller input and combine it with the right controller input to form a virtual gaming controller with a single controller input representation. The right gaming controller thereafter provides the single controller input representation to the mobile device for provision to the gaming application.

Figure 6B:
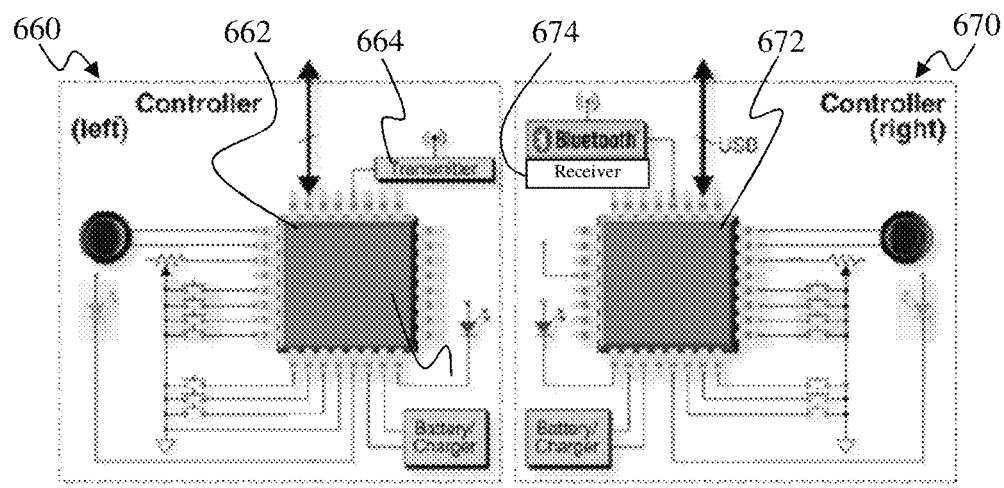
FIG. 6B illustrates a circuit schematic of the hardware gaming controllers of FIG. 6A.

FIG. 6B illustrates a circuit schematic of the hardware gaming controllers of FIG. 6A. Circuit 660 provides a representation of the hardware component connections in relation to left gaming controller 622. A programmable controller 662 can be provided in the left gaming controller 622, arranged to carry out functionality relating to operating a gaming controller. Further, a wireless transmitter 664 is provided and coupled to the controller 662. The wireless transmitter 664 can be a Bluetooth transmitter.

Correspondingly, Circuit 670 provides a representation of the hardware component connections in relation to right gaming controller 624. A programmable controller 672 can be provided in the left gaming controller 624, arranged to carry out functionality relating to operating a gaming controller. A wireless receiver 674 is provided and coupled to the controller 672. The wireless receiver 674 can be a Bluetooth receiver. According to embodiments, the left controller 662 is configured to generate a left controller input based on user manipulation of the left gaming controller 622. The left controller input is thereafter sent from the wireless transmitter 664 of left gaming controller 622 to the wireless receiver 674 of right gaming controller 624. In embodiments, both controllers 620 can include wireless transceivers for dual directional wireless data communication.

Right gaming controller 624 further includes a USB plug, which can be coupled to the controller 670, the USB plug for establishing a data communication coupling with the USB port 640 of the mobile device. Right controller 674 is arranged to deliver left controller input and right controller input as distinct data packets to the mobile device 610. In embodiments, right controller 674 is arranged to deliver left controller input and right controller input as a virtual gaming controller with a single controller input representation to the mobile device 610. In various embodiments, both left controller 662 and right controller 672 can be Bluetooth enabled, instead of providing separate transmitters or transceivers in the gaming controllers 620.

Figure 7:
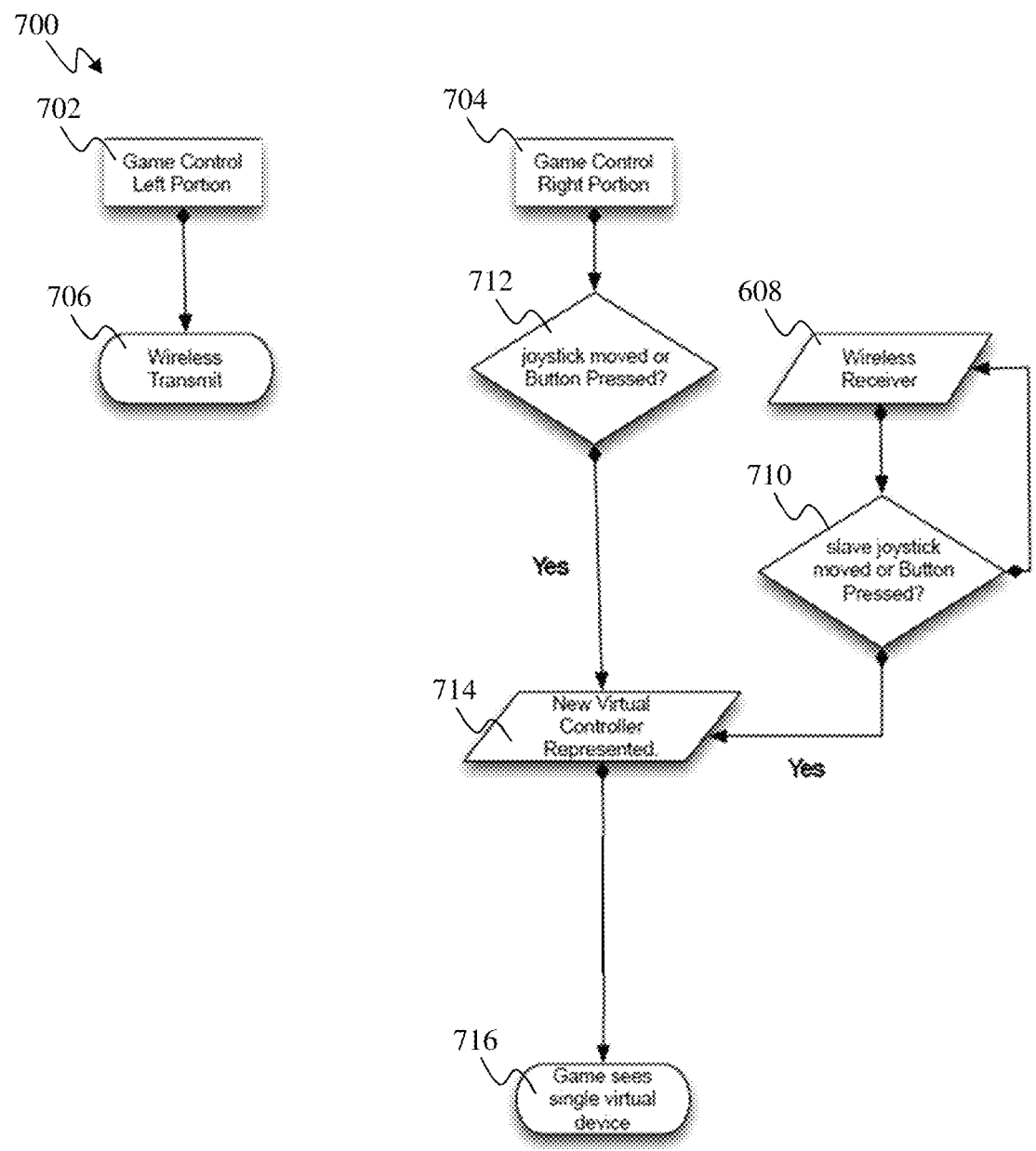
FIG. 7 illustrates a flow chart setting out the operation of gaming controllers in a mobile gaming device according to an embodiment.

FIG. 7 illustrates a flow chart setting out the operation of gaming controllers in a mobile gaming device according to an embodiment. The flow chart 700 of FIG. 7 can correspond to the operation of gaming controllers in a mobile gaming device, as shown and described in FIGS. 6A and 6B. In flow chart 700, the left gaming controller 622 is schematically represented by game control left portion block 702, while the right gaming controller 624 is schematically represented by game control left portion block 704. A wireless transmitter 706 can be provided for the left controller 622 for wirelessly coupling to the right controller 624, and the left controller 622 can wirelessly generate and transmit left controller input to the right controller 624. Right controller 624 can include a wireless receiver 708 for wirelessly coupling to the left controller 622.

A monitoring block 710 can be provided for determining if a joystick is moved or a gaming control button is depressed on the right controller 624 and HID information is sent from the left controller 622 to the right controller 624, from wireless transmitter 706 to wireless receiver 708. If no movement or control input is detected, a loop back is made to continue monitoring the wireless receiver 708 having a wireless transmission coupling for any left controller input from the left controller 622. Further, the left controller input received by the right controller 624 is subsequently relayed or delivered to the mobile device 610 through a USB interface between the right controller 624 and the mobile device 610. Monitoring block 712 can be provided for determining if a joystick is moved or a gaming control button is depressed on the right controller 624 and if so, HID information is sent from the right controller 622 to the mobile device 610 over the USB interface between the right controller 624 and the mobile device 610.

A device driver 642 can be provided on the mobile device 610 to receive HID data from either the left controller 622 or the right controller 624 for processing. The device driver can receive HID input from the left controller 402 only, from the right controller 404 only, or from the left controller 402 and the right controller 404, either concurrently, or within a predetermined time period or sampling period. In an embodiment, the device driver 642 can receive from the right controller 624 a virtual gaming controller input with HID information including a single controller input representation formed through a combination of a left controller input and a right controller input. The device driver upon receiving HID controller input proceeds to process the received controller information.

At 714, a virtual controller is formed, based on the input received from the device driver. The mobile device 610 can include a virtual controller module 646 which can be configured to combine the received data packets obtained from the left controller 622 and/or the right controller 624 to form a virtual gaming controller with a single controller input representation. In an embodiment, the controller 672 of the right gaming controller 624 receives left controller input, and carries out a combination of left controller input and right controller input to form a virtual controller with a single controller input representation. The virtual controller is subsequently provided to the mobile device 610 through the USB interface between the right controller 624 and the mobile device 610. At 716, the virtual gaming controller including combined controller input is provided to the software application 648 for handling.

Figure 8:
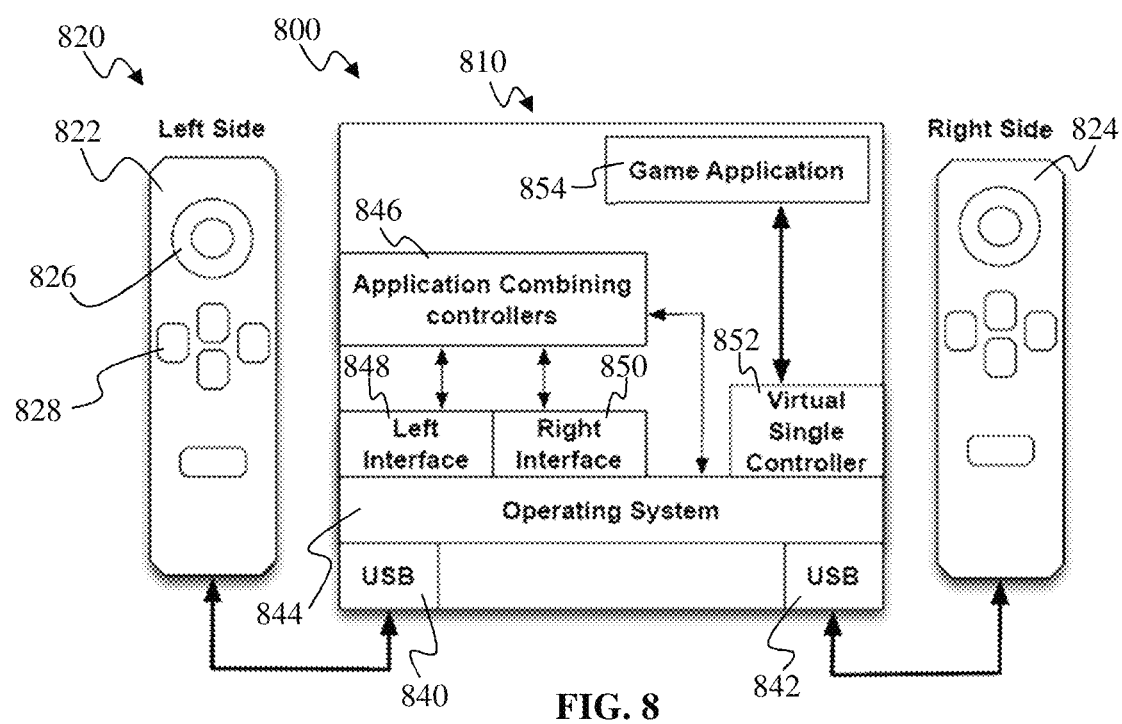
FIG. 8 illustrates a schematic representation of a mobile gaming device 800 according to an embodiment.

FIG. 8 illustrates a schematic representation of a mobile gaming device 800 according to an embodiment. Controllers 820 are provided for a mobile device 810. First left-side hardware controller 822 and second right-side hardware controller 824 are provided and arranged for coupling with the mobile device 810. The gaming controllers 820 can include a variety of hardware controller buttons, for example, joystick 826, gaming control buttons 828, etc. Other buttons or functionality can be included, where needed. Mobile device 810 can include a left USB port 840 for coupling with a USB plug on the left controller 822 and a right USB port 842 for coupling with a USB plug on the right controller 824. Left controller 822 and right controller 824 generate left controller input and right controller input respectively, based on user input or manipulation. The left controller input and right controller input are sent to the mobile device through left USB port 840 and right USB port 842 respectively.

According to an embodiment, device drivers are not included in the mobile device 810 for HID input interpretation. In an embodiment, a combination application 846 operating on the operating system 844 of the mobile device can receive HID information from controllers 820 and can create a virtual controller in combining the left controller input and right controller input. The combination application 846 can include a left controller interface 848 and a right controller interface 850. The left controller input and right controller input are received by the operating system 844 in the mobile device from left USB port 840 and right USB port 842 respectively. The left controller input is thereafter provided to the left controller interface 848 of the combination application 846 and the right controller input is provided to the right controller interface 850 of the combination application 846. Further, it is noted that in providing the left controller input and the right controller input directly to the operating system 844, a controller representation is formed for both left controller input and the right controller input.

The combination application 846 is configured to create a new game controller or a virtual game controller representation, which can include a single controller input representation that contains all the elements of a combined controller based on both the left controller input and the right controller input. The combination application 846 can be configured to create the virtual game controller representation 852 on the operating system. The virtual controller representation 852 is thereafter passed on to a game application 854 running on the mobile device 810. Such a mobile gaming device 800 can be provided if the gaming application 854 running on the operating system 844 can support the selection of a game controller from multiple controller inputs. In such a way, the combined virtual controller input is utilized, and the hardware-generated left controller input and right controller input are ignored. The operation system 844 can be a Windows, Linux or Android operating system, which allows for virtual USB devices to be introduced in application space. It can be noted that a Linux or Android operating system can allow for HID inputs to be sent directly into a kernel on the operating system, in creating a virtual device.

In various embodiments, two game controllers can be connected to a mobile device without using the generic HID protocol, but using, for example, vendor-specific device interface protocols. Such an instance would prevent the operation system from creating unwanted interfaces, for example left interface 848 and right interface 850 as described above, for the physical controller devices. A user space application can be provided on the operating system of the mobile device to communicate with each of the left gaming controller and the right gaming controller using raw USB or Bluetooth data. The user space application then combines the left and right controller information together to create a single virtual controller, on or using the operating system. In comparison with mobile gaming device 800 in the embodiment described above, the user space application combines all information into a single virtual device, instead of the gaming application choosing from between the physical left and right controller and the virtual controller with combined data. The single virtual device representation is then sent to the operating system and the gaming application, which will only detect a single controller which is the virtual device representation.

In an embodiment, the user space application then combines the left and right controller information together to create a single virtual controller representation in user space. The controllers can use standard HID protocols to connect, which then informs the operating system, for provision to the game application. The game application may thus be provided with three devices, and a user can select the single virtual controller representation for input into the game.

Figure 9:
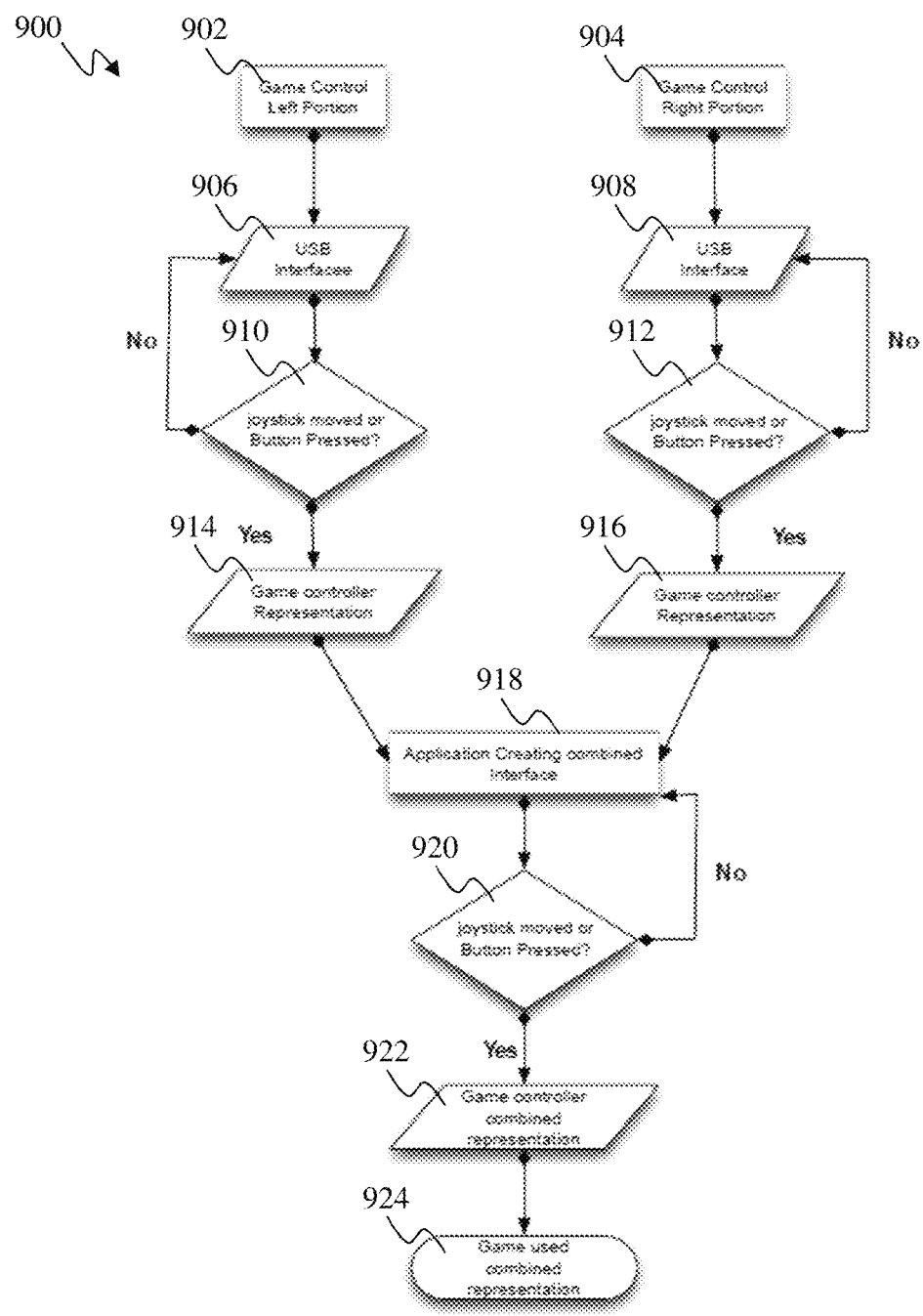
FIG. 9 illustrates a flow chart setting out the operation of gaming controllers in a mobile gaming device according to an embodiment.

FIG. 9 illustrates a flow chart setting out the operation of gaming controllers in a mobile gaming device according to an embodiment. The flow chart 900 of FIG. 9 can correspond to the operation of gaming controllers in a mobile gaming device, as shown and described in FIG. 8. In an embodiment, the flow chart 900 can represent where a user space application is utilized for representation. The user space application can utilize standard HID protocols, a proprietary format using USB, Bluetooth, or wireless protocols. In flow chart 900, left gaming controller 822 is schematically represented by game control left portion block 902, while right gaming controller 824 is schematically represented by game control left portion block 904. A USB interface 906 can be provided for left controller 822 and USB interface 908 can be provided for right controller 824. A monitoring block 910 can be provided for determining if a joystick is moved or a gaming control button is depressed on the left controller 822 and if so, HID information is sent from the left controller 822 to the mobile device 810 over USB interface 906. If no movement or control input is detected, a loop back is made to continue monitoring USB interface 906 for any left controller input from the left controller 822. If movement or control input is detected, the process flow carries on. HID input is delivered from the left controller 822 to the USB port 840 of the mobile device 810. Correspondingly, a monitoring block 912 is provided for the right controller 224, operating in a similar manner.

In receiving left controller input from left USB port 840, which is then provided to the operating system 844, a left controller representation 914 can be formed, based on the left controller input. Left controller representation 914 can be formed in the user space application. Operating system 844 further can receive right controller input from right USB port 842, through which a right controller representation 916 is formed, based on the right controller input. Right controller representation 916 can be formed in the user space application. At 918, a combination application can receive left controller representation 914 or right controller representation 916. Such a combination application can include logic or software portions in the user space application which can combine the representative input 916, 918, into a single controller representation. In embodiments, the combination application can receive left controller input or right controller input, which can also be part of the left controller representation 914 or right controller representation 916. A virtual controller is thereafter formed, based on the left controller input and the right controller input.

A further monitoring block 920 is included, for which determines whether a controller event occurs, i.e. if a joystick is moved or a gaming control button depressed, on any one of the controllers. If so, the single virtual controller representation is thereafter sent into the operating system. At 922, the operating system receives the game controller combined representation, and can translate HID information for the virtual game controller input. Block 922 can be considered the interface to the operating system of a virtual HID device. At 924, the game application can receive the translated HID information for utilization of a user's gaming input.

In various embodiments, a keyboard can be provided in two portions, each portion for connecting to a processor for usage as a single device, based on a single virtual controller representation, derived according to the present disclosure. A keyboard can be cut in half and each half placed into devices using the HID protocol. The operating system would see two different keyboards, each just being half of a proper keyboard. According to an embodiment, by providing a single virtual keyboard representation, a software application can receive input from a single keyboard, allowing for macro functions or even activation of secondary functions with e.g. the shift or control key, which would not work if received from two separate keyboards, to work.

Figure 10:
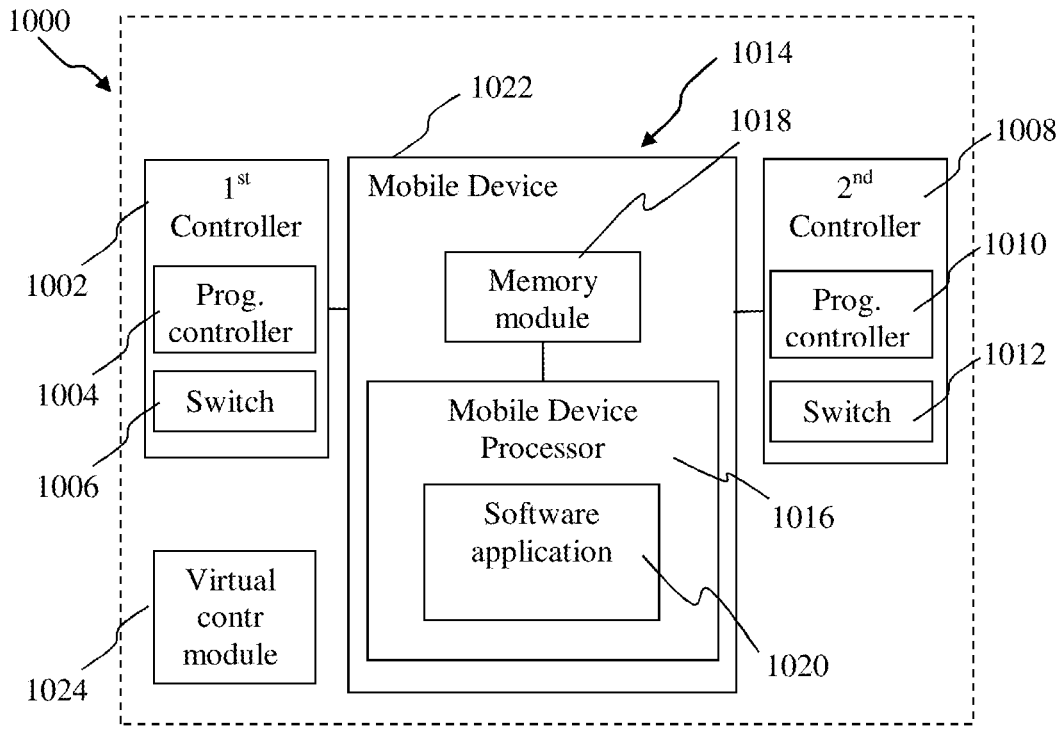
FIG. 10 illustrates a schematic of a gaming controller according to an aspect of the present disclosure.

FIG. 10 illustrates a schematic of a gaming controller for a mobile device according to an aspect of the present disclosure. Gaming controller 1000 can include a first hardware gaming controller 1002 including a first programmable controller 1004 and at least one input switch 1006, the at least one input switch 1006 of the first hardware gaming controller 1002 configured to be manipulated by a user's left thumb and/or fingers to generate a left controller input with the first programmable controller 1004. The gaming controller 1000 can also include a second hardware gaming controller 1008 including a second programmable controller 1010 and at least one input switch 1012, the at least one input switch 1012 of the second hardware gaming controller configured to be manipulated by a user's right thumb and/or fingers to generate a right controller input with the second programmable controller 1010.

Further the first hardware gaming controller 1002 and the second hardware gaming controller 1008 are each configured to be removably coupleable with a mobile device 1014 including a mobile device processor 1016 coupled to a memory module 1018 and configured to run a software application 1020. According to embodiments, the first hardware gaming controller is configured to be mechanically secured to a side portion of a housing 1022 of the mobile device, and the second hardware gaming controller is configured to be mechanically secured to an opposing side portion of the housing 1022 of the mobile device. In embodiments, the left controller input and the right controller input are combined with a virtual controller module 1024 to form a virtual gaming controller with a single controller input representation for providing to the software application 1020.

In an embodiment, the first hardware gaming controller, for example the first programmable controller in the first hardware gaming controller, includes a serial bus connection to the mobile gaming processor and the second hardware gaming controller for example the second programmable controller in the second hardware gaming controller, includes a separate serial bus connection to the mobile device processor.

In an embodiment, the first hardware gaming controller includes a first wireless transceiver coupled to the first programmable controller and the second hardware gaming controller includes a second wireless transceiver coupled to the second programmable controller, for establishing a wireless data coupling.

In an embodiment, the first hardware gaming controller and the second hardware gaming controller are configured to establish separate wireless data couplings to the mobile device processor.

In an embodiment, a wireless data coupling is configured to be established between the first programmable controller in the first hardware gaming controller and the second programmable controller in the second hardware gaming controller. In an embodiment, a wireless data coupling is established between the first programmable controller and the second programmable controller.

In an embodiment, any one of the first hardware gaming controller or the second hardware gaming controller includes a serial bus connection to the mobile device processor. In an embodiment, any one of the first hardware gaming controller or the second hardware gaming controller further establishes a wireless data coupling to the mobile device.

In an embodiment, the wireless data coupling is any one of a Bluetooth connection, a Wireless Universal Serial Bus (WUSB) connection, a radio frequency connection, or an infrared data connection.

In an embodiment, the mobile device processor is configured to receive the left controller input and the right controller input as distinct data packets.

In an embodiment, an operating system running on the mobile device processor is configured to receive the left controller input and the right controller input as distinct data packets, the virtual controller module is configured for operation on the operating system.

In an embodiment, a device driver running on the mobile device processor is configured to receive the left controller input and the right controller input as distinct data packets, for interpreting the data packets for communication with the operating system.

In an embodiment, further including a data coupling between the first programmable controller in the first hardware gaming controller and the second programmable controller in the second hardware gaming controller; wherein the virtual controller module is configured for operation on any one of the first programmable controller or the second programmable controller.

According to an aspect of the present disclosure, there can be provided a mobile device for gaming, including: a mobile computer, including a housing and a mobile device processor coupled to a memory module and provided within the housing, the mobile device processor configured to run a software application; a first hardware gaming controller mechanically secured to a side portion of the housing of the mobile computer, the first hardware gaming controller including a first programmable controller and at least one input switch, the at least one input switch of the first hardware gaming controller configured to be manipulated by a user's left thumb and/or fingers to generate a left controller input with the first programmable controller; and a second hardware gaming controller mechanically secured to an opposing side portion of the housing of the mobile computer, the second hardware gaming controller including a second programmable controller and at least one input switch, the at least one input switch of the second hardware gaming controller configured to be manipulated by a user's right thumb and/or fingers to generate a right controller input with the second programmable controller; a virtual controller module configured to combine the left controller input and the right controller input to form a virtual gaming controller with a single controller input representation for providing to the software application.

Figure 11:
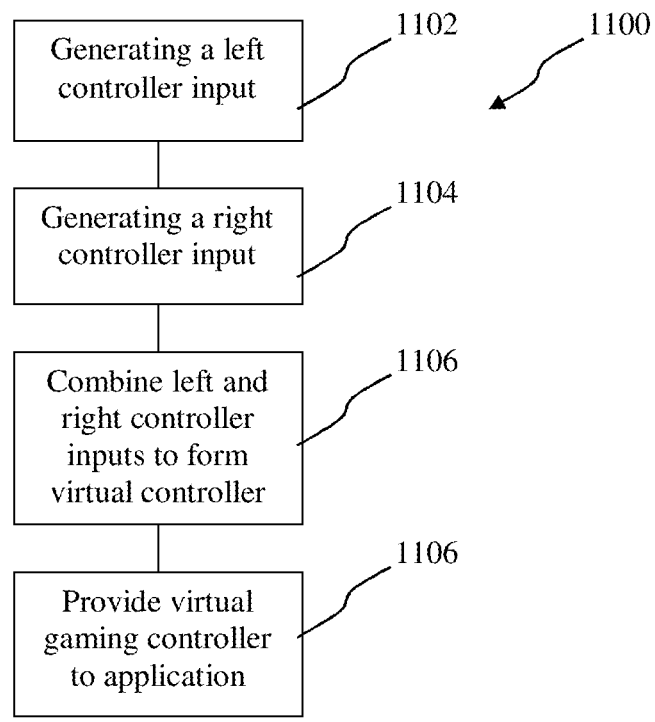
FIG. 11 illustrates a block diagram of a method according to an aspect of the present disclosure.

FIG. 11 illustrates a block diagram of a method according to an aspect of the present disclosure. Method 1100 can be a method of operating a gaming controller including a first hardware gaming controller and a second hardware gaming controller each configured to be removably coupleable with a mobile device, the first hardware gaming controller configured to be mechanically secured to a side portion of a housing of a mobile device, and the second hardware gaming controller configured to be mechanically secured to an opposing side portion of the housing of the mobile device. In 1102, the method can include generating a left controller input with a first programmable controller in the first hardware gaming controller, the first hardware gaming controller configured to be manipulated by a user's left thumb and/or fingers. In 1104, the method can include generating a right controller input with a second programmable controller in the second hardware gaming controller, the second hardware gaming controller configured to be manipulated by a user's right thumb and/or fingers. In 1106, the method can include combining the left controller input and the right controller input to form a virtual gaming controller with a single controller input representation. In 1108, the method can include providing the virtual gaming controller to a software application operating on a mobile processor in the mobile device.

In an embodiment, the method includes sending the left controller input and the right controller input separately each through a serial bus connection to the mobile device processor.

In an embodiment, the method includes sending the left controller input to the mobile device processor through a first serial bus connection between the first hardware gaming controller and the mobile computer.

In an embodiment, the method includes sending the right controller input to the mobile device processor through a second serial bus connection between the second hardware gaming controller and the mobile device.

In an embodiment, the method includes sending the left controller input to the mobile device processor through a first wireless data coupling between the first hardware gaming controller and the mobile device.

In an embodiment, the method includes sending the right controller input to the mobile device processor through a second wireless data coupling between the second hardware gaming controller and the mobile device.

In an embodiment, the method includes sending controller input from the any one of the first hardware gaming controller or the second hardware gaming controller to the corresponding second hardware gaming controller or first hardware gaming controller respectively, through a wireless data coupling.

In an embodiment, the method includes sending the left controller input and the right controller input to the mobile device processor through any one of a serial bus connection or a wireless data coupling between the corresponding second hardware gaming controller or first hardware gaming controller and the mobile computer.

In an embodiment, the method includes receiving the left controller input and right controller input as distinct data packets, by the mobile device processor.

In an embodiment, the method includes combining the left controller input and the right controller input with the virtual controller module operating on the mobile device processor.

In an embodiment, the method includes interpreting the distinct data packets with a device driver on the mobile device processor.

In an embodiment, the method includes receiving the left controller input and the right controller input in any one of the first hardware gaming controller or the second hardware gaming controller, and combining the left controller input and the right controller input with the virtual controller module operating on any one of the first hardware gaming controller or the second hardware gaming controller.

According to various embodiments, there is provided at least one computer program product directly loaded into a non-transitory memory module of a digital computer provided in a mobile device of the present disclosure. The computer program product can include software code portions for performing the steps of a method according to an embodiment of the present disclosure when the at least one computer product is run on the at least one digital computer.

In various embodiments, there is provided a controller for carrying out an operational function in the mobile device, which can include, but not limited to, a first hardware gaming controller microcontroller, a second hardware gaming controller microcontroller, a mobile computer processing system, etc. The controller can include a digital computer configured to receive a computer program product. In embodiments, several digital computers or microprocessors are synchronized and operate cooperatively as part of an overall system.

The following examples pertain to further embodiments.

Example 1 is a gaming controller for a mobile device, including: a first hardware gaming controller including a first programmable controller and at least one input switch, the at least one input switch of the first hardware gaming controller configured to be manipulated by a user's left thumb and/or fingers to generate a left controller input with the first programmable controller; and a second hardware gaming controller including a second programmable controller and at least one input switch, the at least one input switch of the second hardware gaming controller configured to be manipulated by a user's right thumb and/or fingers to generate a right controller input with the second programmable controller; the first hardware gaming controller and the second hardware gaming controller each configured to be removably coupleable with a mobile device, the mobile device including a housing, and a mobile device processor coupled to a memory module and provided with the housing, the mobile device processor configured to run a software application; wherein the first hardware gaming controller is configured to be mechanically secured to a side portion of the housing of the mobile device, and the second hardware gaming controller is configured to be mechanically secured to an opposing side portion of the housing of the mobile device; and wherein the left controller input and the right controller input are combined with a virtual controller module to form a virtual gaming controller with a single controller input representation for providing to the software application.

In example 2, the subject matter of example 1 can optionally include that the first hardware gaming controller includes a serial bus connection coupling the first programmable controller to the mobile device processor and the second hardware gaming controller includes a separate serial bus connection coupling the second programmable controller to the mobile device processor.

In example 3, the subject matter of example 1 or 2 can optionally include where the first hardware gaming controller includes a first wireless transceiver coupled to the first programmable controller and the second hardware gaming controller includes a second wireless transceiver coupled to the second programmable controller, for establishing a wireless data coupling.

In example 4, the subject matter of example 3 can optionally include where the first hardware gaming controller and the second hardware gaming controller are configured to establish separate wireless data couplings to the mobile device processor.

In example 5, the subject matter of example 3 can optionally include where a wireless data coupling is configured to be established between the first programmable controller in the first hardware gaming controller and the second programmable controller in the second hardware gaming controller.

In example 6, the subject matter of example 5 can optionally include where any one of the first hardware gaming controller or the second hardware gaming controller includes a serial bus connection to the mobile device processor.

In example 7, the subject matter of example 5 can optionally include where any one of the first hardware gaming controller or the second hardware gaming controller further establishes a wireless data coupling to the mobile device.

In example 8, the subject matter of any one of examples 3 to 7 can optionally include where the wireless data coupling is any one of a Bluetooth connection, a Wireless Universal Serial Bus (WUSB) connection, a radio frequency connection, or an infrared data connection.

In example 9, the subject matter of any one of examples 1 to 8 can optionally include where the mobile device processor is configured to receive the left controller input and the right controller input as distinct data packets.

In example 10, the subject matter of example 9 can optionally include where wherein an operating system running on the mobile device processor is configured to receive the left controller input and the right controller input as distinct data packets; and where the virtual controller module is configured for operation on the operating system.

In example 11, the subject matter of any one of examples 9 or 10 can optionally include where a device driver running on the mobile device processor is configured to receive the left controller input and the right controller input as distinct data packets by, for interpreting the data packets for communication with the operating system.

In example 12, the subject matter of any one of examples 1 to 11 can optionally include a data coupling between the first programmable controller in the first hardware gaming controller and the second programmable controller in the second hardware gaming controller; wherein the virtual controller module is configured for operation on any one of the first programmable controller or the second programmable controller.

Example 13 is a method of operating a gaming controller, the gaming controller including a first hardware gaming controller and a second hardware gaming controller each configured to be removably coupleable with a mobile device, the first hardware gaming controller configured to be mechanically secured to a side portion of a housing of a mobile device, and the second hardware gaming controller configured to be mechanically secured to an opposing side portion of the housing of the mobile device, the method including: generating a left controller input with a first programmable controller in the first hardware gaming controller, the first hardware gaming controller configured to be manipulated by a user's left thumb and/or fingers; generating a right controller input with a second programmable controller in the second hardware gaming controller, the second hardware gaming controller configured to be manipulated by a user's right thumb and/or fingers; combining the left controller input and the right controller input to form a virtual gaming controller with a single controller input representation; and providing the virtual gaming controller to a software application operating on a mobile device processor in the mobile device.

In example 14, the subject matter of example 13 can optionally include sending the left controller input and the right controller input separately each through a serial bus connection to the mobile device processor.

In example 15, the subject matter of example 14 can optionally include sending the left controller input to the mobile device processor through a first serial bus connection between the first hardware gaming controller and the mobile device, and sending the right controller input to the mobile device processor through a second serial bus connection between the second hardware gaming controller and the mobile device.

In example 16, the subject matter of example 13 can optionally include sending the left controller input to the mobile device processor through a first wireless data coupling between the first hardware gaming controller and the mobile device, and sending the right controller input to the mobile device processor through a second wireless data coupling between the second hardware gaming controller and the mobile device.

In example 17, the subject matter of example 13 can optionally include sending controller input from the any one of the first hardware gaming controller or the second hardware gaming controller to the corresponding second hardware gaming controller or first hardware gaming controller respectively, through a wireless data coupling.

In example 18, the subject matter of example 17 can optionally include sending the left controller input and the right controller input to the mobile device processor through any one of a serial bus connection or a wireless data coupling between the corresponding second hardware gaming controller or first hardware gaming controller and the mobile device.

In example 19, the subject matter of any one of examples 13 to 18 can optionally include receiving the left controller input and right controller input as distinct data packets, by the mobile device processor.

In example 20, the subject matter of example 19 can optionally include combining the left controller input and the right controller input with the virtual controller module operating on the mobile device processor.

In example 21, the subject matter of example 19 or 20 can optionally include interpreting the distinct data packets with a device driver on the mobile device processor.

In example 22, the subject matter of any one of examples 13 to 21 can optionally include receiving the left controller input and the right controller input in any one of the first hardware gaming controller or the second hardware gaming controller; and combining the left controller input and the right controller input with the virtual controller module operating on any one of the first hardware gaming controller or the second hardware gaming controller.

The above apparatus, method and/or system as described and illustrated in the corresponding figures, is not intended to limit an or any apparatus, method or system as according to an embodiment, and the scope of the present disclosure. The description further includes, either explicitly or implicitly, various features and advantages of the method or system according to the present disclosure, which can be encompassed within an apparatus, method or system according to the disclosure.

While embodiments of the disclosure have been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A mobile device, comprising:
   a housing;
   a mobile device processor in the housing, the mobile device processor coupled to a memory module and configured to run a software application; and
   a virtual controller module;
   wherein a side portion of the housing is configured to be removably coupleable to a first hardware gaming controller configured to be manipulated by a user's left thumb and/or fingers to generate a left controller input,
   wherein an opposing side portion of the housing is configured to be removably coupleable to a second hardware gaming controller configured to be manipulated by a user's right thumb and/or fingers to generate a right controller input;
   wherein the virtual controller module is configured to combine the left controller input and the right controller input to form a single controller input representation for providing to the software application.

2. The mobile device of claim 1, wherein the mobile device processor is configured to receive the left controller input and the right controller input as distinct data packets.

3. The mobile device of claim 2, wherein each of the data packets corresponding to the left controller input and the right controller input comprises a respective identifier to identify the corresponding data packet as being from the first hardware gaming controller or the second hardware gaming controller.

4. The mobile device of claim 1, wherein an operating system running on the mobile device processor is configured to receive the left controller input and the right controller input as distinct data packets; and wherein the virtual controller module is configured for operation on the operating system.

5. The mobile device of claim 4, wherein a device driver running on the mobile device processor is configured to receive the left controller input and the right controller input as distinct data packets, for interpreting the data packets for communication with the operating system.

6. A gaming controller for a mobile device, comprising:
a first hardware gaming controller comprising a first programmable controller and at least one input switch, the at least one input switch of the first hardware gaming controller configured to be manipulated by a user's left thumb and/or fingers to generate a left controller input with the first programmable controller; and
a second hardware gaming controller comprising a second programmable controller and at least one input switch, the at least one input switch of the second hardware gaming controller configured to be manipulated by a user's right thumb and/or fingers to generate a right controller input with the second programmable controller;
wherein the first hardware gaming controller is configured to be removably coupleable to a side portion of a housing of a mobile device, and the second hardware gaming controller is configured to be removably coupleable to an opposing side portion of the housing of the mobile device, the mobile device configured to run a software application,
wherein the left controller input and the right controller input are combinable using a virtual controller module to form a virtual gaming controller with a single controller input representation for providing to the software application.

7. The gaming controller of claim 6, wherein the first hardware gaming controller comprises a serial bus connection coupling the first programmable controller to the mobile device and the second hardware gaming controller comprises a separate serial bus connection coupling the second programmable controller to the mobile device.

8. The gaming controller of claim 6, wherein the first hardware gaming controller comprises a first wireless transceiver coupled to the first programmable controller and the second hardware gaming controller comprises a second wireless transceiver coupled to the second programmable controller, for establishing a wireless data coupling.

9. The gaming controller of claim 6, wherein the first hardware gaming controller and the second hardware gaming controller are configured to establish separate wireless data couplings to the mobile device.

10. The gaming controller of claim 6, wherein a wireless data coupling is configured to be established between the first programmable controller in the first hardware gaming controller and the second programmable controller in the second hardware gaming controller.

11. The gaming controller of claim 6, wherein any one of the first hardware gaming controller or the second hardware gaming controller comprises a serial bus connection to the mobile device.

12. The gaming controller of claim 11, wherein any one of the first hardware gaming controller or the second hardware gaming controller further establishes a wireless data coupling to the mobile device.

13. The gaming controller of claim 8, wherein the wireless data coupling is any one of a Bluetooth connection, a Wireless Universal Serial Bus (WUSB) connection, a radio frequency connection, or an infrared data connection.

14. The gaming controller of claim 6, further comprising a data coupling between the first programmable controller in the first hardware gaming controller and the second programmable controller in the second hardware gaming controller; wherein the virtual controller module is configured for operation on any one of the first programmable controller or the second programmable controller.

15. The gaming controller of claim 6, wherein the left controller input and the right controller input are distinct data packets.

16. The gaming controller of claim 15, wherein each of the data packets corresponding to the left controller input and the right controller input comprises a respective identifier to identify the corresponding data packet as being from the first hardware gaming controller or the second hardware gaming controller.

17. The gaming controller of claim 6, wherein each of the first hardware gaming controller and the second hardware gaming controller is mechanically securable to a respective side portion of the housing of the mobile device.

18. A non-transitory computer-readable medium comprising instructions which, when executed by a processor, causes the processor to perform a method of operating a gaming controller, the method comprising: receiving a left controller input generated by a first programmable controller in a first hardware gaming controller through a data coupling between the first hardware gaming controller and the mobile device, the first hardware gaming controller configured to be manipulated by a user's left thumb and/or fingers;
receiving a right controller input with a second programmable controller in a second hardware gaming controller through a data coupling between the first hardware gaming controller and the mobile device, the second hardware gaming controller configured to be manipulated by a user's right thumb and/or fingers;
combining the left controller input and the right controller input to form a single controller input representation; and
providing the single controller input representation to a software application operating on a mobile device processor in the mobile device.

19. The non-transitory computer-readable medium of claim 18, wherein the method further comprises:
receiving the left controller input and right controller input as distinct data packets, by the mobile device processor in the mobile device.

20. The non-transitory computer-readable medium of claim 19, wherein each of the data packets corresponding to the left controller input and the right controller input comprises a respective identifier to identify the corresponding data packet as being from the first hardware gaming controller or the second hardware gaming controller.

* * * * *